United States Patent Office 3,008,960
Patented Nov. 14, 1961

3,008,960
STEROIDAL SPIRO-TETRAHYDRO-FURANS AND PROCESS THEREFOR
Arthur A. Patchett, Metuchen, N.J., assignor to Merck & Co., Inc., Rahway, N.J., a corporation of New Jersey
No Drawing. Filed Jan. 31, 1961, Ser. No. 86,004
17 Claims. (Cl. 260—239.57)

This invention relates to new steroid intermediates. More specifically, this invention relates to compounds of the structure

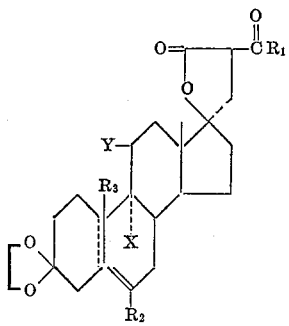

in which $R_1$ may be hydrogen or $COOR_4$, $R_4$ being lower alkyl, $R_2$ may be hydrogen, halogen or lower alkyl, $R_3$ may be H or $CH_3$, but must be $CH_3$ unless X is hydrogen, X may be hydrogen or halogen, Y may be hydrogen, β-hydroxyl or keto oxygen or X and Y together may be a $\Delta^{9(11)}$ double bond, although when Y is hydroxyl X should be H and when X is halogen, Y must be keto, and the dotted line in the 5,10 position shows an alternative position of the 5,6 double bond when $R_3$ is H.

We have found new steroid compounds which are very useful in the preparation of types of compounds known to have aldosterone antagonist activity. The compounds of this invention are derivatives of 20-spirox-5-ene-21-ones. We propose the term spiroxanes as a generic term for steroidal spiro-tetrahydrofurans of the formula

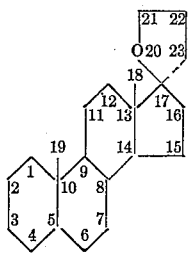

The numbering used in this ring system is shown in the above formula. Thus, the compounds of this invention are 3-ethylenedioxy-22-acyl-20-spirox-5-ene-21-ones or their 19-nor homologs. The acyl group in the 22 position may be formyl or alkoxyoxalyl. In addition to these substituents, the compounds may, if desired, have halogens or alkyl groups in the 6 position, 9 halogens, 11 oxygenation or $\Delta^{9(11)}$. Since, under the conditions of the reactions used, 9-halo-11-hydroxy steroids tend to lose hydrogen halide and form an epoxy ring, it is necessary for the 11 position to be keto when a 9 halogen is present and for the 9 position to be unsubstituted when a hydroxyl is in the 11 position. In addition, in the 19-nor compounds, X can only be hydrogen since when 9α-halogens or $\Delta^{9(11)}$ double bonds are present in 19-nor steroids dehydrohalogenation or double bond shifts produces $\Delta^{9(10)}$ double bonds.

The starting materials for this preparation are known in the literature and references to many of them are shown as footnotes in the flow sheet. In the case of 6-halogen or 6-alkyl starting materials, the 9 and 11 substituents can be introduced into the steroid rings in the same manner as is done with the 6-unsubstituted compounds in the references shown. The starting materials thus may be illustrated by the following compounds:

20-spirox-4-ene-3,21-dione;
6-fluoro-20-spirox-4-ene-3,21-dione;
6-chloro-20-spirox-4-ene-3,21-dione;
6-methyl-20-spirox-4-ene-3,21-dione;
20-spirox-4,9(11)-diene-3,21-dione;
6-fluoro-20-spirox-4,9(11)-diene-3,21-dione;
6-chloro-20-spirox-4,9(11)-diene-3,21-dione;
6-methyl-20-spirox-4,9(11)-diene-3,21-dione;
6-fluoro-20-spirox-4-ene-3,11,21-trione;
6-bromo-20-spirox-4-ene-3,11,21-trione;
6-chloro-11β-hydroxy-20-spirox-4-ene-3,21-dione;
6-fluoro-11β-hydroxy-20-spirox-4-ene-3,21-dione;
9α-fluoro-20-spirox-4-ene-3,11,21-trione;
9α-chloro-20-spirox-4-ene-3,11,21-trione;
19-nor-20-spirox-4-ene-3,21-dione;
19-nor-20-spirox-4-ene-3,11,21-trione;
19-nor-20-spirox-4-ene-11β-ol-3,21-dione.

The compounds of this invention are prepared, as illustrated in Schematic Flow Sheet I, by first protecting the 3-keto group by formation of an ethylenedioxy ring. This shifts the $\Delta^4$ double bond to either a 5(6) or 5(10) position in the case of the 19-nor compounds. Both of these isomers are probably present and thus the 19-nor compounds of this invention are written with a dotted line in the 5(10) position to show the alternative position of the double bond. When the dioxolane ring is cleaved off later using the products of this invention the double bond reverts to the $\Delta^4$ position. When the 19 methyl is present, the shift is only to the 5(6) position. The 22 position of the 3-dioxolane spiroxenone is then acylated by reaction with methyl formate or an alkyl oxalate. The oxalate used can be any di-(lower alkyl) oxalate, such as the ethyl, methyl, propyl, isopropyl, butyl and the like esters. It is preferred to use dimethyl oxalate.

The importance of the compounds of this invention is the presence in the 21 and 22 positions of a beta-keto ester type of structure. This is a chemical structure known to be of great utility in chemical synthesis, as in aceto-acetic ester and similar compounds. These compounds thus open the possibility of forming a large number of 22-substituted derivatives of the spiroxenone structure by the use of the various known beta-keto ester type reactions. Two such reactions are known in Schematic Flow Sheet II, namely, the formation of 22-halogen or 22-alkyl derivatives followed by the transformation of these compounds into 7-alkanoylthio derivatives. This latter type of structure is known to be one which gives high aldosterone antagonist activity. In addition, some of the intermediate compounds prepared (e.g., compounds F and G in Schematic Flow Sheet II, when $R_2$ is not hydrogen) are also of types known to have such activity. Many other 22 substituents can be obtained from the compounds of this invention by the use of other known reactions which are normally carried out on acetoacetic ester and similar beta keto compounds, followed by a synthetic route similar to that shown in Schematic Flow Sheet II, to arrive at an aldosterone antagonist type of structure.

This application is a continuation-in-part of our co-pending application Serial No. 38,710, filed June 27, 1960.

This invention can be illustrated by the following examples:

Example 1

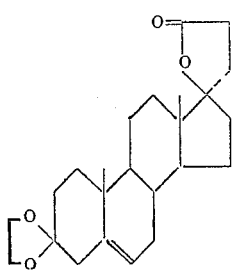

A mixture of 1.850 g. of 20-spirox-4-ene-3,21-dione, 100 cc. of butanone dioxolane (distilled from lithium aluminum hydride) and 60 mg. of p-toluenesulfonic acid monohydrate is distilled for 4¾ hours through a Vigreaux column. The residue is partitioned between 5% aqueous sodium bicarbonate and benzene. The organic layer is washed with water and dried, and the solvent is removed in vacuo. The residue is chromatographed over 50 gms. of neutral alumina and eluted with mixtures of ether and chloroform to give 3-ethylenedioxy-20-spirox-5-ene-21-one, which has the above structure.

I. PREPARATION OF THE COMPOUNDS

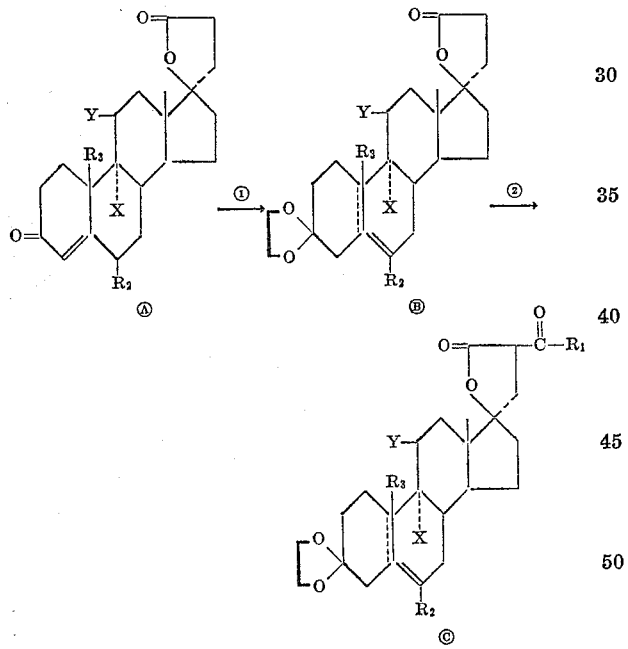

Definitions:
$R_1 =$ H or

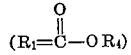

$R_2 =$ H, halogen or lower alkyl.
$R_3 =$ H or $CH_3$, being $CH_3$ when X is not hydrogen.
$R_4 =$ lower alkyl.
X = H, halogen or (with Y) a $\Delta^{9(11)}$ double bond, being H when Y is OH.
Y = H, $\beta =$ OH, keto oxygen or (with X) a $\Delta^{9(11)}$ double bond, being keto oxygen when X is halogen.

Note—Dotted line in 5(10) position of Compounds B and C indicates alternative position of 5(6) double bond in 19-nor compounds. Either isomer is possible in the 19-nor series and both may be present. Eventual removal of dioxolane ring will restore $\Delta^4$ double bond.

Sources of starting materials (Compounds A):
$R_2 =$ H, $R_3 = CH_3$, X = H, Y = H (J. Am. Chem. Soc., 79, 4808 (1957)).
$R_2 =$ H, $R_3 = CH_3$, X and Y = $\Delta^{9(11)}$ (J. Org. Chem., 25, 96 (1960)).
$R_2 =$ H, $R_3 = CH_3$, X = H, Y = keto O (J. Org. Chem. 25, 96 (1960)).
$R_2 =$ H, $R_3 = CH_3$, X = halogen, Y = keto O (J. Org. Chem. 25, 96 (1960)).
$R_2 = CH_3$, $R_3 = CH_3$, X = H, Y = H (U.S. 2,938,031).
$R_2 =$ halogen, $R_3 = CH_3$, X = H, Y = H (U.S. 2,946,787).
$R_2 =$ H, $R_3 =$ H, X = H, Y = H (J. Org. Chem. 24, 1109 (1959)).
$R_2 =$ H, $R_3 =$ H, X = H, Y = H (J. Org. Chem. 25, 96 (1960)).
$R_2 =$ H, $R_3 =$ H, X = H, Y = keto O (J. Org. Chem. 25, 96 (1960)).

Reagents:
① Butanone dioxolane plus an acid catalyst such as p-toluene sulfonic acid. Other dioxolanes of aliphatic ketones can also be used.
② Heating with NaH and ethylformate ($R_1 =$ H) or dialkyl oxalate $$(R_1 = \overset{O}{\overset{\|}{C}} - OR_4)$$

in benzene. Other inert solvents such as toluene, xylene, are equally usable. $R_4$ can be methyl, ethyl, propyl, etc. Methyl or prolyl formate can be used. Dimethyl oxalate is preferred.

II. UTILIZATION OF THE COMPOUNDS AS INTERMEDIATES

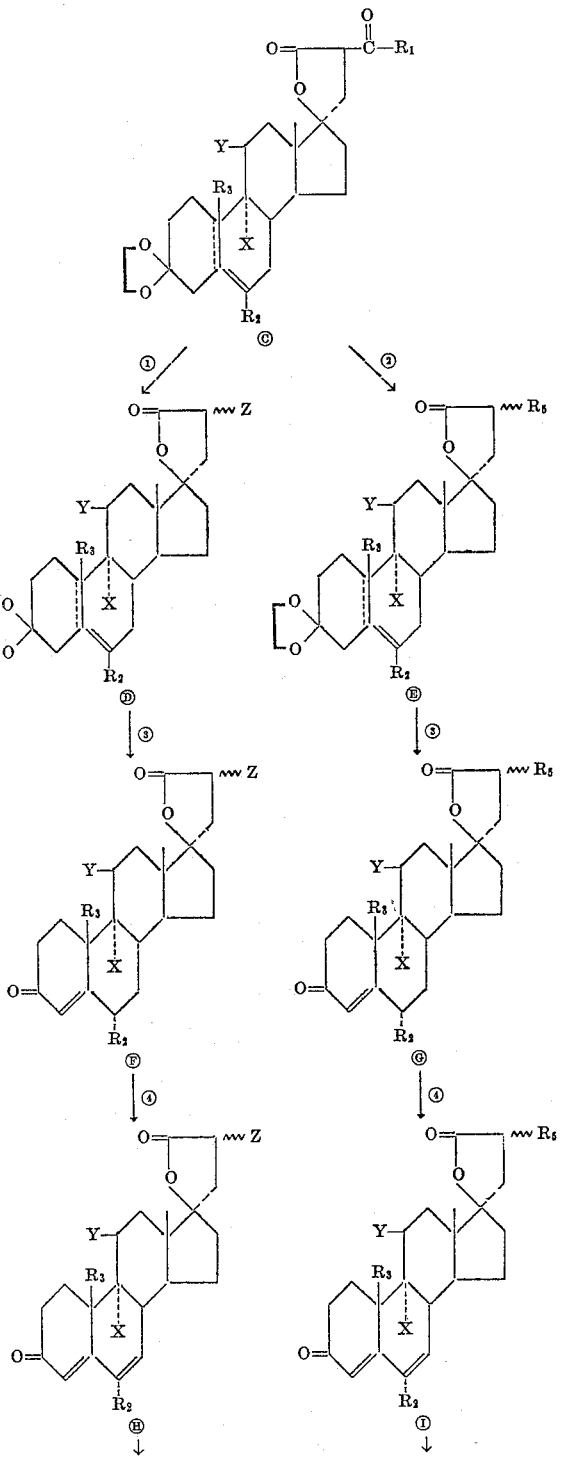

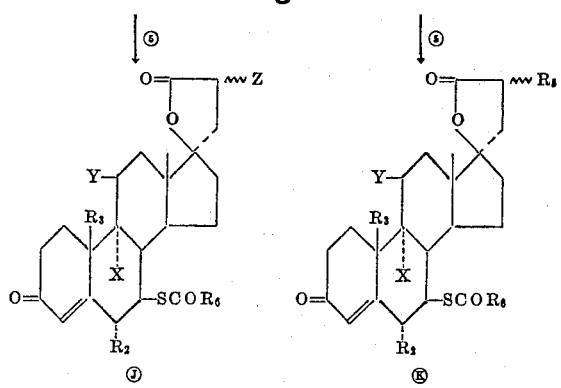
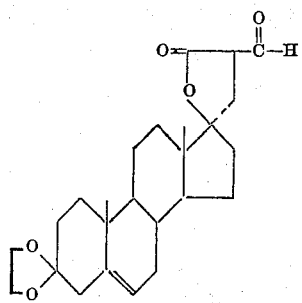

Definitions:
$R_1 = H$ or $$\overset{O}{\underset{\|}{C}}-OR_4$$

$R_2 = H$, halogen or lower alkyl, being H in steps ④ and ⑤·
$R_3 = H$ or $CH_3$, being $CH_3$ whenever X is not halogen.
$R_4 =$ lower alkyl.
$R_5 =$ lower alkyl.
$R_6 =$ lower alkyl.
$X = H$, halogen or (with Y) $\alpha\Delta^{9,(11)}$ double bond, being H when Y is hydroxyl.
$Y = H$, B—OH keto O or (with X) $\alpha\Delta^{9,(11)}$ double bond, being keto when X is halogen.
$Z =$ halogen.
Wavy line to $C_{22}$ substituent shows either $\alpha$ or $\beta$ substitution.
Dotted line in 5(10) position shows possible isomeric position of the 5(6) double bond in the 19-nor series.

Reagents:
① $NaOC_2H_5$ in pyridine, under nitrogen, followed by perchloryl fluoride at 0°. Drown in water and extract product with ether. This introduces F. To put in Br or Cl, use $Br_2$ or $Cl_2$ instead of perchloryl fluoride and no $NaOC_2H_5$.
② $NaOC_2H_5$ in pyridine, under nitrogen, followed by an alkyl halide ($R_4I$). Then heat for a short time with the excess $NaOC_2H_5$, drown and extract the product with ether.
③ Acid catalyst (p-toluene sulfonic acid e.g.) in acetone.
④ Heating with chloranil in t-butanol.
⑤ Heating with a thioalkanoic acid, e.g., thioacetic acid.

Example 2

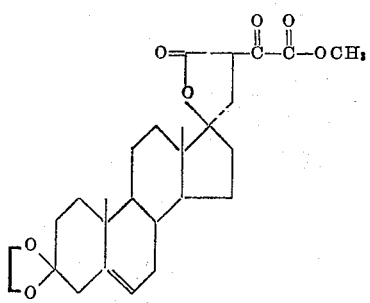

3.5 g. of dimethyl oxalate is dissolved in 30 cc. of benzene. The solution is then azeotropically dried to a volume of 25 cc. 1.05 g. of sodium hydride is added. To this suspension is then added 687 mg. of 3-ethylenedioxy-20-spirox-5-ene-21-one. The reaction mixture is maintained at 40° C. overnight with stirring. Dry ether is added and the sodium salts which separate are then washed several times with ether. The residue is then covered with about 10 cc. of benzene and a solution of sodium dihydrogen phosphate (pH of 4) is added as quickly as possible at 0° C. The separated aqueous layer is twice extracted with ether and the combined organic layers are dried. The solvent is removed under reduced pressure and the residue is recrystallized several times to yield 3-ethylenedioxy-22-methoxyoxalyl-20-spirox-5-ene-21-one. When equivalent quantities of diethyl oxalate, dipropyl oxalate and dibutyl oxalate are used in place of the dimethyl oxalate, the corresponding 22-alkoxy-oxalyl derivatives are obtained.

Example 3

The procedure of Example 2 is followed replacing dimethyl oxalate with an equivalent quantity of ethyl formate and using a temperature of 60° as the reaction temperature. The product is 3-ethylenedioxy-22-formyl-20-spirox-5-ene-21-one.

Example 4

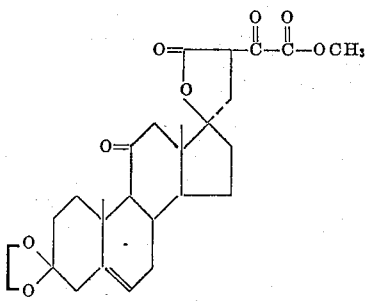

The procedures of Examples 1 and 2 are followed using as a starting material 20-spirox-4-ene-3,11,21-trione to produce 3-ethylenedioxy-22-methoxyoxalyl-20-spirox-5-ene-11,21-dione. When 9α-fluoro-20-spirox-4-ene-3,11,21-trione, 19-nor-20-spirox-4-ene-3,21-dione, 19-nor-20-spirox-4-ene-11β-ol-3,21-dione, 19-nor-20-spirox-4-ene-3,11,21-trione, or 20-spirox-4,9(11)-diene-3,21-dione are used as the starting material, there is obtained the correspondingly substituted products, namely, 3-ethylenedioxy-9α-fluoro-22-methoxyoxalyl-20-spirox-5-ene-11,21-dione, 3-ethylenedioxy-19-nor-22-methoxyoxalyl-20-spirox-5-ene-3,21-dione, 3-ethylenedioxy-19-nor-22-methoxyoxalyl-20-spirox-5(6)-ene-11β-ol-21-one, 3-ethylenedioxy-19-nor-22-methoxyoxalyl-20-spirox-5(6)-ene-11,21-dione, or 3 - ethylenedioxy - 22 - methoxyoxalyl - 20 - spirox - 5, 9(11)-diene-21-one. In the case of the 19-nor compounds, there are also formed compounds having the corresponding $\Delta^{5(10)}$ structure in place of the $\Delta^{5(6)}$ structure shown above.

Example 5

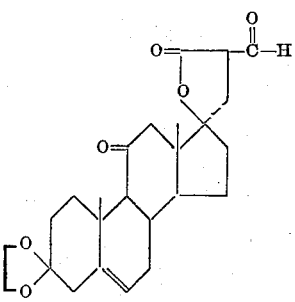

The procedures of Examples 1 and 3 are followed using as the starting material 20-spirox-4-ene-3,11,21-trione to produce 3-ethylenedioxy-22-formyl-20-spirox-5-ene-11,21-dione. When 9α-fluoro-20-spirox-4-ene-3,11, 21-trione, 19-nor-20-spirox-4-ene-11β-ol-3,21-dione, or 19-nor-20-spirox-4-ene-3,11,21-trione are used as the starting material, the correspondingly substituted 22- formyl derivative is obtained. In the case of the 19-nor compounds, there is formed a mixture of Δ⁵⁽⁶⁾ and Δ⁵⁽¹⁰⁾ compounds.

*Example 6*

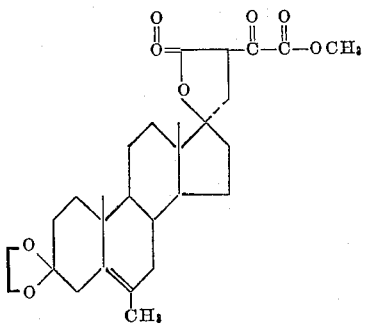

The procedure of Examples 1 and 2 is followed using 6-methyl-20-spirox-4-ene-3,21-dione as the starting material to produce 3-ethylenedioxy-6-methyl-22-methoxyoxalyl-20-spirox-5-ene-21-one. When the corresponding 6-chloro or 6-fluoro-20-spirox-4-ene-3,21-dione is used as the starting material, the correspondingly 6-substituted 3-ethylenedioxy-22-methoxyoxalyl-20-spirox-5-ene-21-one is obtained.

*Example 7*

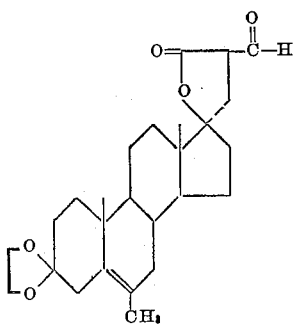

The procedures of Examples 1 and 3 are followed using 6-methyl-20-spirox-4-ene-3,21-dione as the starting material to produce 3-ethylenedioxy-6-methyl-22-formyl-20-spirox-5-ene-21-one. When 6-chloro- or 6-fluoro-20-spirox-4-ene-3,21-dione is used instead as the starting material, the correspondingly 6-substituted 3-ethylenedioxy-22-formyl-20-spirox-5-ene-21-one is obtained.

We claim:
1. Compounds of the formula

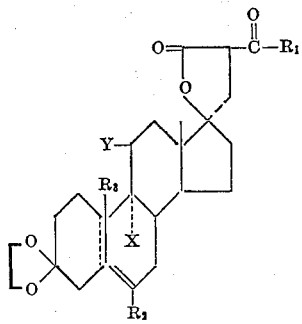

in which $R_1$ is selected from the group consisting of H and

$R_4$ being lower alkyl, $R_2$ is selected from the group consisting of hydrogen, halogen and lower alkyl, $R_3$ is selected from the group consisting of hydrogen and methyl, but is methyl when X is other than hydrogen, X is selected from the group consisting of hydrogen, halogen and together with Y a 9,11-double bond, Y is selected from the group consisting of hydrogen, β-hydroxyl, keto oxygen and together with X a 9,11-double bond, X being hydrogen when Y is hydroxyl and Y being keto oxygen when X is halogen, and the dotted line in the $C_5$–$C_{10}$ position indicates an alternative position of the $C_5$—$C_6$ double bond when $R_3$ is H.

2. The compound

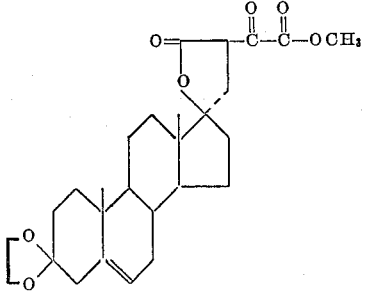

3. The compound

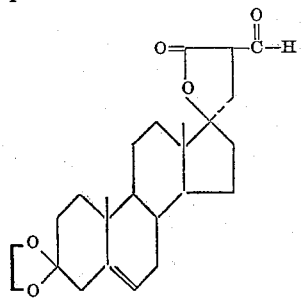

4. The compound

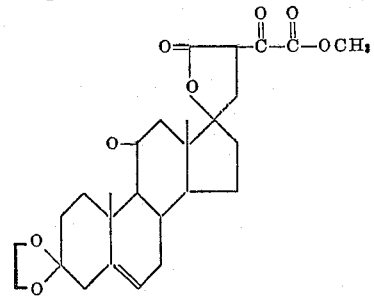

5. The compound

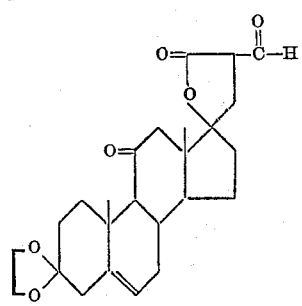

6. The compound

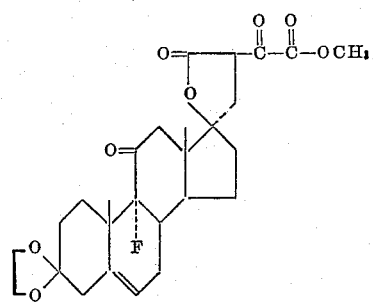

7. The compound
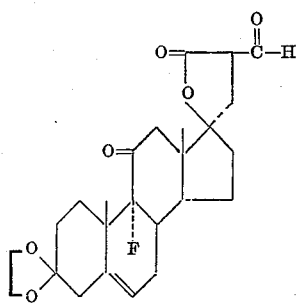
8. The compound
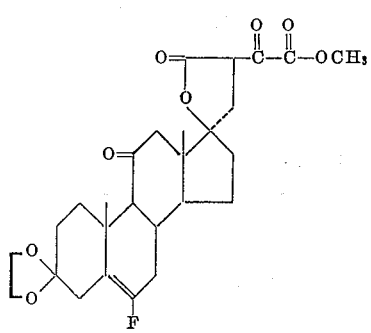
9. The compound
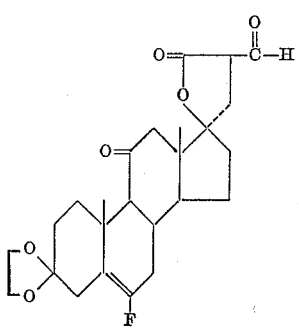
10. The compound
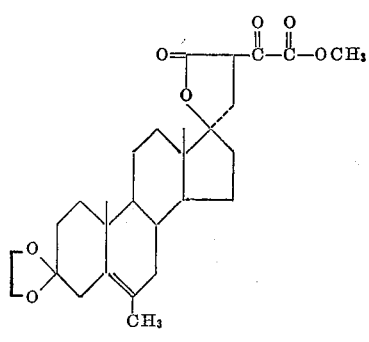
11. The compound
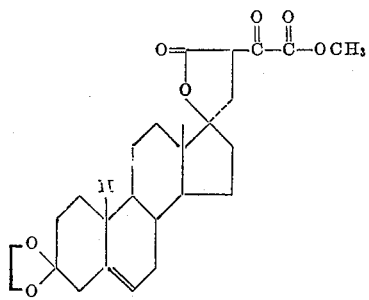
12. The compound
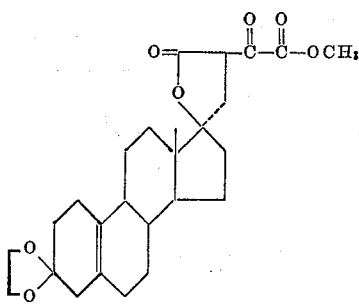
13. The compound
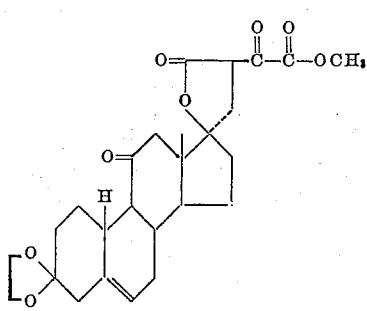
14. The compound
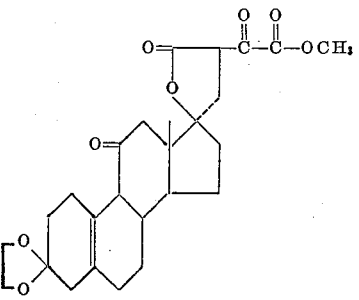
15. The compound
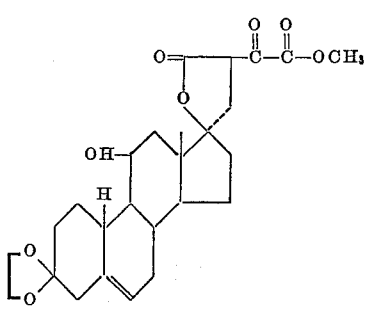
16. The compound
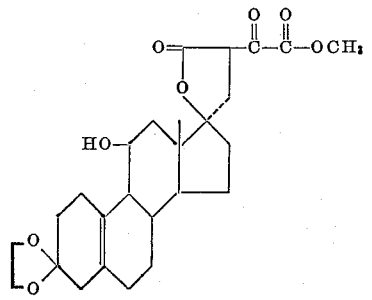

17. The process of preparing compounds of the formula—

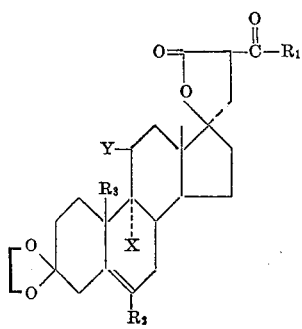

in which $R_1$ is selected from the group consisting of H and

in which $R_4$ is lower alkyl, $R_2$ is selected from the group consisting of halogen and lower alkyl, $R_3$ is selected from the group consisting of hydrogen and methyl but is methyl when X is other than hydrogen, X is selected from the group consisting of hydrogen, halogen and together with Y a 9,11 double bond, and Y is selected from the group consisting of hydrogen β-hydroxyl, keto oxygen, and together with X a 9,11 double bond, X being hydrogen when Y is hydroxyl and Y being keto when X is halogen, which comprises heating and agitating a mixture of an ester selected from the group consisting of alkyl formates and alkyl oxalates with sodium hydride, a compound of the structure—

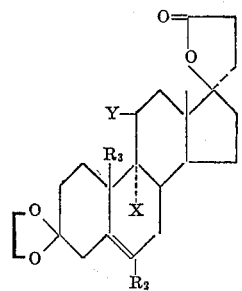

and an inert solvent.

No references cited.